US006996463B2

(12) United States Patent
Kondo

(10) Patent No.: US 6,996,463 B2
(45) Date of Patent: Feb. 7, 2006

(54) VEHICLE ELECTRONIC CONTROL APPARATUS INCORPORATING A PLURALITY OF MICROCOMPUTERS AND IMPLEMENTING A MICROCOMPUTER MONITORING FUNCTION

(75) Inventor: Hiroshi Kondo, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/379,548

(22) Filed: Mar. 6, 2003

(65) Prior Publication Data

US 2003/0171858 A1 Sep. 11, 2003

(30) Foreign Application Priority Data

Mar. 7, 2002 (JP) ....................................... 2002-061557

(51) Int. Cl.
*G06F 7/00* (2006.01)

(52) U.S. Cl. ........................................... 701/29; 701/36

(58) Field of Classification Search .................. 701/29, 701/30, 33, 34, 35, 36
See application file for complete search history.

(56) References Cited

U.S. PATENT DOCUMENTS 5,493,495 A * 2/1996 Naito et al. .................. 701/76
6,212,467 B1 * 4/2001 Guzella et al. ............. 701/103

FOREIGN PATENT DOCUMENTS

| | | |
|---|---|---|
| JP | 61-49154 | 3/1986 |
| JP | 3-14136 | 1/1991 |
| JP | 05-108415 | 4/1993 |
| JP | 05-302541 | 11/1993 |
| JP | 07-013788 | 1/1995 |
| JP | 11-250029 | 9/1999 |
| JP | 2000-163274 | 6/2000 |
| JP | 2001-227402 | 8/2001 |

* cited by examiner

*Primary Examiner*—Yonel Beaulieu
(74) *Attorney, Agent, or Firm*—Nixon & Vanderhye P.C.

(57) ABSTRACT

A vehicle ECU (Electronic Control Unit) has a main microcomputer and an auxiliary microcomputer, with the main microcomputer periodically executing a processing routine for calculating values such as degrees of throttle opening of the vehicle engine based upon the current operating condition of the engine, wherein the main microcomputer generates resource inspection data during each execution of the routine and transmits the resource inspection data to the auxiliary microcomputer, with the resource inspection data including for example respective checksums for values calculated in successive steps of the routine and information indicating whether all steps of the routine have been actually executed, and with the auxiliary microcomputer monitoring the operation of the main microcomputer based upon the received resource inspection data.

16 Claims, 11 Drawing Sheets

VEHICLE ELECTRONIC CONTROL APPARATUS INCORPORATING A PLURALITY OF MICROCOMPUTERS AND IMPLEMENTING A MICROCOMPUTER MONITORING FUNCTION

BACKGROUND OF THE INVENTION

1. Field of Application

The present invention relates to an electronic control apparatus, such as a vehicle ECU (Electronic Control Unit), which incorporates a plurality of microcomputers, and in particular to an electronic control apparatus having a plurality of microcomputers and a microcomputer monitoring function.

2. Description of Prior Art

Types of vehicle ECU are known in the prior art which control an actuator of the vehicle engine, where the term actuator as used herein and in the appended claims signifies any device such as a throttle, fuel injection pump, etc., which affects the operation of the vehicle. The functions of such an ECU can include controlling the throttle position (i.e., degree of opening of the throttle valve) of the vehicle engine. In such an ECU, a microcomputer periodically calculates a target value of throttle position, based upon input parameters including the current accelerator position (i.e., degree of accelerator pedal actuation), and controls driving of a throttle motor for setting the actual throttle position in accordance with that target value. In that way, the throttle position can be controlled appropriately in accordance with the extent to which the accelerator is actuated by the driver of the vehicle.

It has also been proposed in the prior art to use an ECU having a main microcomputer which calculates values of throttle position as described above, and a auxiliary microcomputer which monitors the operation of the main microcomputer. In this case, the auxiliary microcomputer can monitor the main microcomputer to check that it is calculating appropriate values for the throttle position and is generating appropriate command values for operating the throttle motor, i.e., the auxiliary microcomputer checks that throttle control is being correctly applied.

The following methods could be utilized to perform such monitoring:

(1) Judging whether the actual throttle position that is established, based on calculated values of target throttle position, is within a predetermined range of normal values, (2) Arranging that both the main microcomputer and the auxiliary microcomputer calculate each target throttle position, and judging whether both of these values coincide.

However in recent years, throttle control has become more complex, and it has become necessary to harmonize the throttle control function with other functions such as transmission control and traction control. In addition, the number of parameters used in performing a throttle control calculation have increased, and the calculation itself has become more complex. As a result, the contents of processing executed by the main microcomputer have become more complex. Hence, the monitoring function that is performed by the auxiliary microcomputer has become accordingly more complex. Thus the problem arises that, with prior art methods of monitoring, it is necessary to either decrease the accuracy of monitoring or to incur increased manufacturing costs for the monitoring equipment.

Specifically, if method (1) above is used for monitoring of throttle control, it becomes difficult to judge whether a change in the actual throttle position has resulted from an effect such as harmonization with some other type of control function, such as transmission control. Hence it becomes difficult to determine whether the actual throttle position is within a range of normal operation. Furthermore, if some factor other than the degree of accelerator actuation may affect the throttle position, it becomes necessary to extend the distance between the upper and lower limits of the range of degrees of throttle opening which corresponds to normal operation. Hence, the monitoring accuracy will be lowered.

On the other hand, if method (2) above is used for monitoring the throttle control, then the auxiliary microcomputer must have a similar level of processing performance to the main microcomputer, and all of the parameters which are required to calculate a throttle position must be supplied to the auxiliary microcomputer as well as to the main microcomputer, i.e., the auxiliary microcomputer must be capable of performing complex calculations. Hence the number of input ports required for the auxiliary microcomputer will be increased, and an increased level of processing functions and performance will be required for the auxiliary microcomputer. The cost of the auxiliary microcomputer will thereby be accordingly increased.

In addition, the software which is required for monitoring the main microcomputer will depend upon the type of vehicle control that is to be implemented. When there is a change in the vehicle control specifications, it is necessary to change the monitoring software accordingly. If method (2) above is utilized, this will result in increased development time being required for the monitoring software.

SUMMARY OF THE INVENTION

It is an objective of the present invention to overcome the above problems, by providing a vehicle electronic control apparatus which can be manufactured at low cost while providing effective microcomputer monitoring.

According to a first aspect, the invention provides an electronic control apparatus in which a first microcomputer calculates resource inspection data for each of respective resources, such as the CPU, ROM, etc., which are utilized in internal calculation processing executed by that microcomputer, and transmits these resource inspection data to a second microcomputer. The second microcomputer performs monitoring to detect abnormal operation of the first microcomputer, based on the received resource inspection data.

As noted above, the complexity of processing which must be performed in electronic vehicle control, and the number of parameters which must be operated on by a vehicle electronic control apparatus, have increased in recent years, so that the processing which must be executed by the a microcomputer of such an apparatus (i.e., corresponding to the "first microcomputer", referred to as the "main microcomputer" in the following description) has become more complex. With the present invention, respective resource inspection data for the resources that are used by the first microcomputer in performing such complex processing are generated by the first microcomputer and transmitted to a second microcomputer (i.e., auxiliary microcomputer"). The second microcomputer can thereby monitor these resources respectively separately, based on the corresponding resource inspection data, to judge whether each resource is functioning normally. Thus, even when there is an increase in the complexity of the processing that must be executed by the first microcomputer, it is not necessary to correspondingly increase the amount of resources that must be allocated to the second microcomputer, or to enhance the processing performance of the second microcomputer, or make substantial changes in the control program of the second microcomputer. That is to say, monitoring of the first microcomputer can be made substantially independent of changes in the control system, and hence such monitoring can be implemented effectively but at low cost.

The invention moreover provides an electronic control apparatus in which a first microcomputer, in addition to calculating the aforementioned resource inspection data, periodically calculates a target control quantity value for an actuator of an engine based on a current operating condition of the engine and transmits the target control quantity and the corresponding resource inspection data to a second microcomputer. The second microcomputer monitors the functioning of the first microcomputer, including calculation processing which derived the target control quantity value, with the monitoring being based on the received resource inspection data. In that way, the second microcomputer can rapidly detect any abnormality of operation of the first microcomputer, and so can more rapidly respond to such occurrence of abnormal operation.

The invention further provides such an electronic control apparatus, in which each time the first microcomputer performs one of a specific set of calculation operations and stores the calculation result in memory, i.e., in RAM (Random Access Memory), in the process of calculating a control quantity, that calculation value and the inverse of the calculation value are then transmitted to the second microcomputer, as resource inspection data relating to calculation of the control quantity. The second microcomputer can thereby perform monitoring to check that resources used by the first microcomputer in calculating the target control quantity, including the CPU and RAM, are functioning correctly.

The invention moreover provides such an electronic control apparatus, in which the first microcomputer calculates a checksum for calculation processing codes which are read out from a memory device such as a ROM (Read-Only Memory) for use in calculating a control quantity, and transmits that checksum to the second microcomputer, as resource inspection data. The second microcomputer judges the received checksum, to thereby determine whether the memory device is functioning correctly.

The invention further provides such an electronic control apparatus that is applicable to a control system in which after an operation is performed to interrupt the supply of power to the electronic control apparatus (in particular, switching off of the ignition switch, in the case of a vehicle-mounted ECU), a specific shut-down delay interval elapses, before power to the electronic control apparatus is actually interrupted. In this case, the first microcomputer transmits to the second microcomputer calculation processing codes such as ROM codes which were used in calculating a target control quantity value, during each occurrence of the shut-down interval. The second microcomputer then calculates a checksum value for the received calculation processing codes, and judges that checksum value. In that way, the second microcomputer can monitor a specific resource of the first microcomputer, i.e., the device such as a ROM which generated the received codes. In that way, the reliability of monitoring the first microcomputer is increased.

Furthermore in the case of a vehicle ECU, since the calculation processing codes are transmitted during the main relay processing interval after ignition switch switch-off, the communication link between the first and second microcomputers is operating under a low-load condition, so that the codes can be transmitted between the microcomputers without occurrence of errors.

According to another aspect, the first microcomputer initializes a value for use as a processing sequence to inspection value, prior to executing a processing sequence to calculate a value for the target control quantity, and successively updates that value at one or a plurality of successive timings during the processing sequence. On completion of the processing sequence, the first microcomputer transmits the processing sequence inspection value, as resource inspection data to the second microcomputer.

In that way, each time the processing sequence to calculate a target control quantity value is executed by the first microcomputer, the second microcomputer can then judge whether or not all of the steps of the processing sequence have been completed, in calculating that target control quantity value, and so can detect abnormal operation of the first microcomputer.

According to another aspect, when a plurality of determining factors are respectively calculated, in the course of calculating a value for the target control quantity, the first microcomputer calculates respective sets of resource inspection data corresponding to each of these determining factors, and transmits these to the second microcomputer. The second microcomputer judges whether the resource inspection data are normal, for each of the determining factors. Thus, monitoring of the first microcomputer can be performed separately for each of the various determining factors which relate to deriving the target control quantity, based on the resources used in calculating the respective determining factors. As a result, more effective monitoring of the first microcomputer can be achieved, even if the control system becomes complex.

According to another aspect, the first microcomputer transmits each calculated value of a target control quantity together with corresponding resource inspection data to the second microcomputer, within the same communication packet. In that case, the first microcomputer can be monitored in synchronism with calculations of target control quantity values by that microcomputer, i.e., the second microcomputer can monitor the first microcomputer by real-time operation, thereby providing enhanced reliability of monitoring.

When monitoring of the first microcomputer is performed by the second microcomputer, as set out above, the monitoring results will become unreliable if the second microcomputer ceases to operate properly. However with the present invention, the system can be configured such that the first microcomputer also monitors the second microcomputer. Specifically, while the second microcomputer monitors the operation of the first microcomputer based on received resource inspection data, the second microcomputer calculates other resource inspection data (relating to resources that are used in the monitoring processing) and transmits these resource inspection data to the first microcomputer. The first microcomputer thereby uses the received resource inspection data to monitor the second microcomputer. In that way, mutual monitoring can be performed between the two microcomputers, thereby providing enhanced monitoring reliability.

According to another aspect, when there is a plurality of determining factors of a target control quantity, the first microcomputer calculates these determining factors and transmits these to the second microcomputer together with respective sets of resource inspection data relating to the calculations of these determining factors. The second microcomputer judges the respective received determining factors as being valid or invalid for use in deriving a target control quantity value, based upon whether or not the corresponding resource data set indicates that that the corresponding calculation processing (i.e., in which the corresponding determining factor was derived by the first microcomputer) was normal. A decision is then made as to whether the target control quantity is to be calculated using all of the determining factors, a part of the determining factors, or none of these (i.e., control operation is to be terminated).

In that way, even if the calculation processing used to obtain one or more of the determining factors for a target control quantity is found to be abnormal, it may still be possible to derive a valid target control quantity value, i.e., the control system can continue to be operated, with limited functioning. Hence, fail-safe operation of a system such as a vehicle ECU which performs throttle control can be reliably maintained, while reducing the possibility of complete shut-down of control operation.

DESCRIPTION OF PREFERRED EMBODIMENTS

First Embodiment

Figure 1:
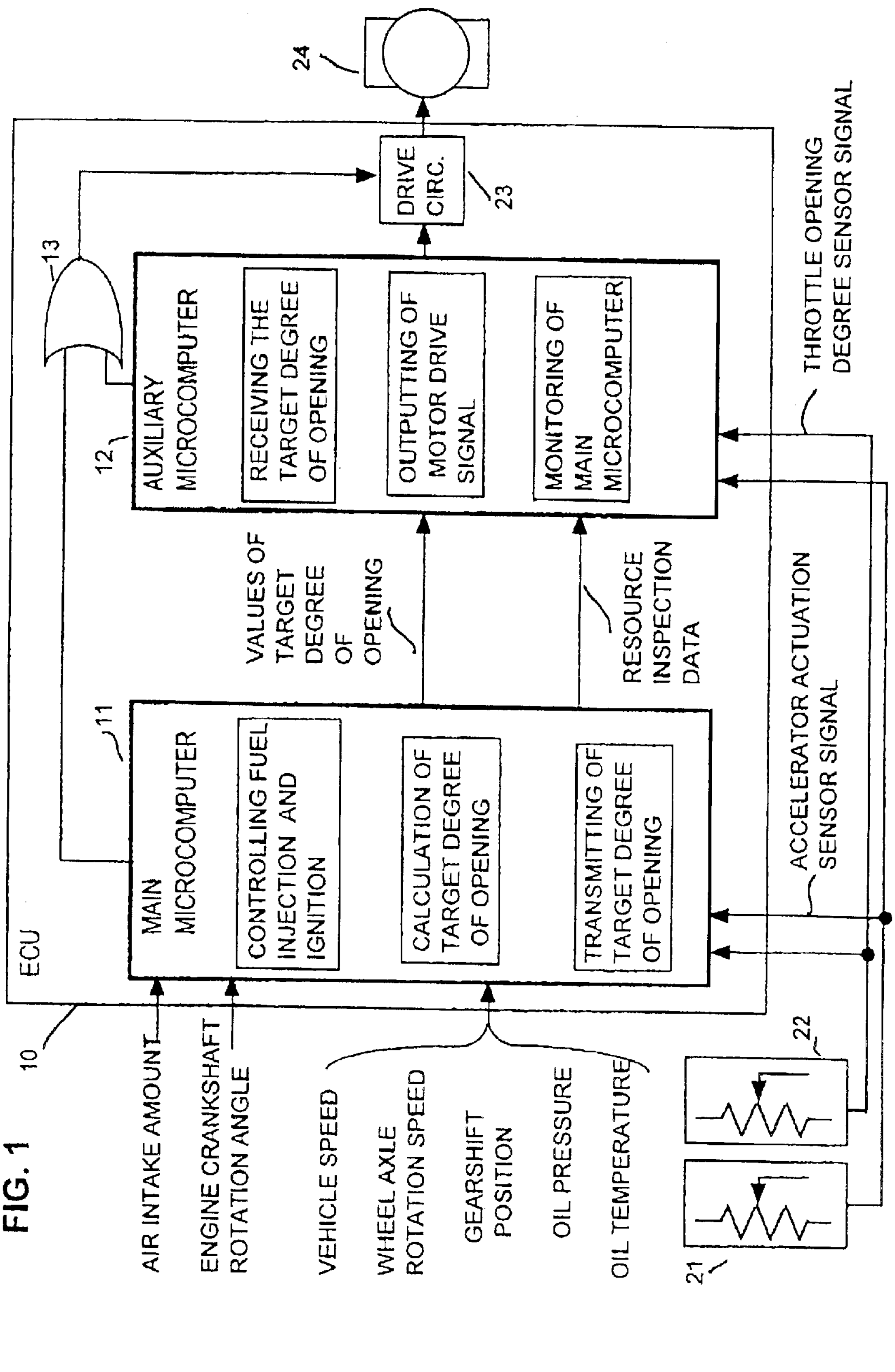
FIG. 1 is a general system block diagram of a first embodiment of an electronic control apparatus.

A first embodiment of an electronic control apparatus will be described in the following, which is a vehicle ECU for controlling engine operation. Although such an ECU can perform other functions such as electronic ignition control etc., for simplicity of description the following will describe only the throttle control function of the ECU. FIG. 1 is a conceptual block diagram showing the basic features of a vehicle control system incorporating the ECU. As shown, the ECU 10 incorporates a main microcomputer 11 and a auxiliary microcomputer 12, each having the usual known component elements of a microcomputer, i.e., a CPU (Central Processing Unit), ROM (Read-Only Memory), RAM (Random Access Memory), A–D (Analog-to-Digital) converter, etc. In addition, the main microcomputer 11 and auxiliary microcomputer 12 are connected for mutual exchange of data, which will be assumed to be based on transfer of data packets.

Each microcomputer operates under a corresponding control program, and it should be understood that operations and processing which are indicated as being performed by a microcomputer, in the following description and in the appended claims, are operations and processing which are specified by a control program of that microcomputer.

As indicated in FIG. 1, the functions of the main microcomputer 11 include derivation of data for control of fuel injection and of ignition, calculation of target values of throttle position, transmission of data including these target values and resource inspection data (described hereinafter) to the auxiliary microcomputer 12. The functions of the auxiliary microcomputer 12 include receiving the target values of throttle position from the main microcomputer 11, generating data expressing a throttle motor drive signal, and monitoring the operation of the main microcomputer 11.

The microcomputers 11 and 12 each receive input signals which include signals expressing detected values of accelerator position (detected, e.g., as a degree of accelerator pedal actuation) and throttle position (i.e., degree of opening of throttle valve), from an accelerator position sensor 21 and a throttle position sensor 22 respectively. As each such input (analog) signal is received by a microcomputer, it is converted to digital form by the D/A converter of that microcomputer. With this embodiment, electronic throttle control is also applied to control the idling speed of rotation of the engine (referred to in the following simply as the "idling speed"), with the air intake flow rate and the crankshaft rotation angle being inputted to the main microcomputer 11 as control parameters for the idling speed. In addition, the throttle control operation is harmonized with control of the automatic transmission of the vehicle, with respective parameters relating to control of the automatic transmission being supplied to the main microcomputer 11. Specifically, the vehicle speed signal, wheel axle rotation signal, gearshift position signal, oil pressure signal, oil temperature signal, etc., are inputted to the main microcomputer 11.

Based on the accelerator position value, the throttle position value, the air intake rate, etc., as input parameters, the main microcomputer 11 calculates a target value of throttle position as a target control quantity, and transmits that target value to the auxiliary microcomputer 12. The auxiliary microcomputer 12 utilizes that target value in conjunction with the actual throttle position (i.e., expressed by the signal produced from the throttle position sensor 22) to calculate a value of motor drive signal and supply that drive signal to the motor drive circuit 23. The throttle drive motor 24 is a DC motor, which rotates the throttle valve by acting against a throttle spring (i.e., a spring which exerts a force tending to return the throttle to a default position). The throttle drive motor 24 is supplied with a pulse waveform drive current from a DC power source, with the duty ratio of the drive current pulses being controlled by the motor drive circuit 23, such as to produce an effective level of motor drive current that is in accordance with the motor drive signal from the auxiliary microcomputer 12. In that way, the actual throttle position is adjusted by feedback control, by deriving a target value for the throttle position based on the accelerator position which is currently being applied by the driver of the vehicle. The motor drive circuit 23 is an H-bridge circuit, so that the throttle drive motor 24 can be controlled for bidirectional rotation.

It should be noted that the invention is not limited in application to a motor such as the throttle drive motor 24 for controlling throttle position, and could equally be applied to control of various other actuator devices of a vehicle.

Numeral 13 denotes an OR gate which performs a power source cut-out function to provide fail-save operation of the throttle control system. If it is found, e.g., as a result of monitoring, that abnormal operation of a microcomputer has occurred, then a "motor drive halt" signal (i.e., a "1" state binary signal in this embodiment) is outputted from at least one of the microcomputers 11 and 12 and supplied to the OR gate 13. A resultant "1" state output from the OR gate 13 acts on the motor drive circuit 23 as a "power source cut-out" control signal, causing the motor drive circuit 23 to disconnect the throttle drive motor 24 from the aforementioned power source. In this condition, the throttle is set to the default position, by the throttle spring.

The procedure whereby a target value of throttle position is calculated and whereby the operation of the main microcomputer 11 is monitored during such a calculation process will be described in the following. Basically, the main microcomputer 11 calculates the target value of throttle position based on all of the determining factors which affect the throttle position, including factors which relate to harmonizing the throttle control with control of the automatic transmission of the vehicle. However for ease of description in the following, it will be assumed that only the accelerator position and a set of control parameters for the idling speed are the determining factors for calculating the target value of throttle position.

Figure 2A:
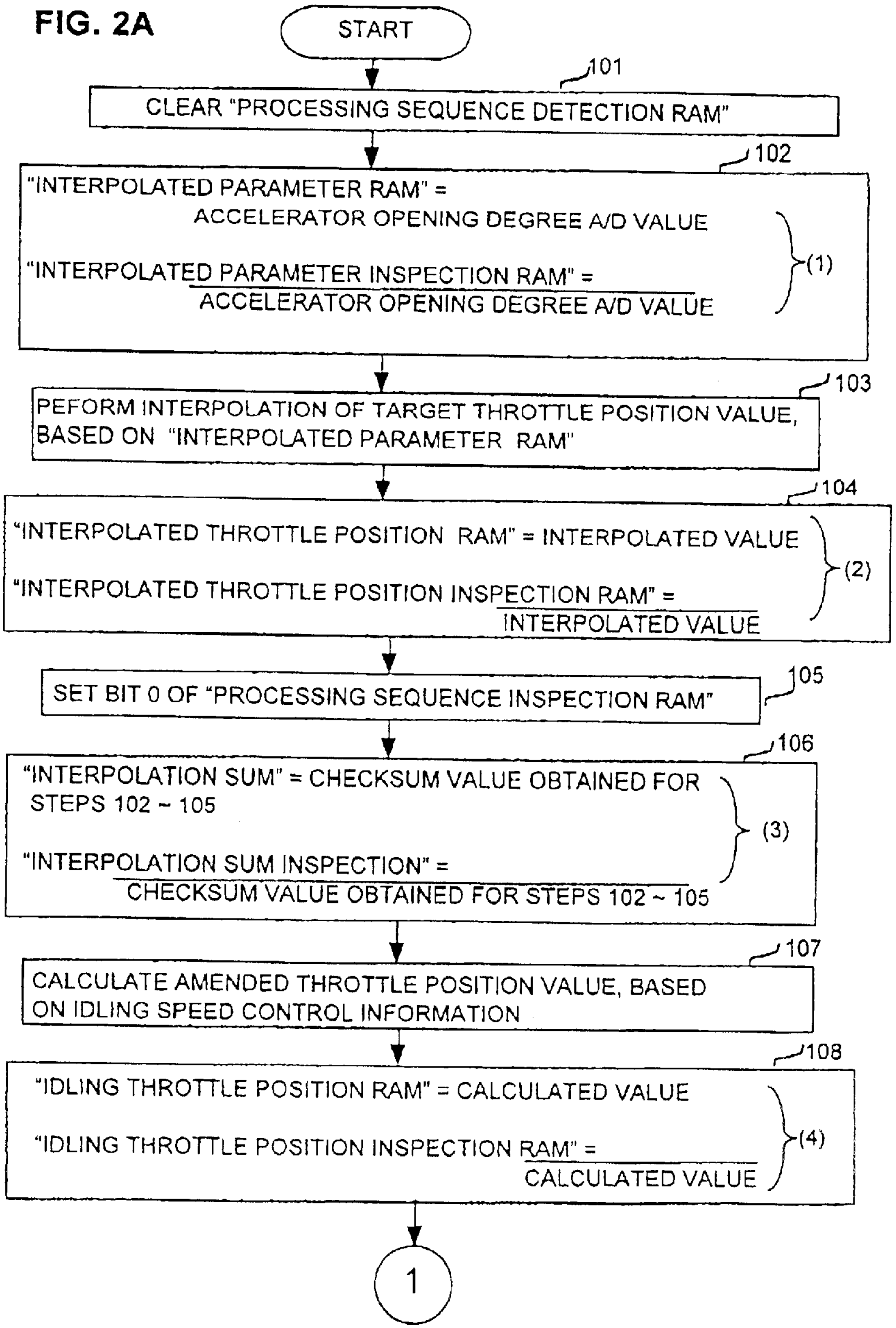
FIGS. 2A, 2B constitute a flow diagram of processing executed by the embodiment for calculating target values of throttle position.
Figure 2B:
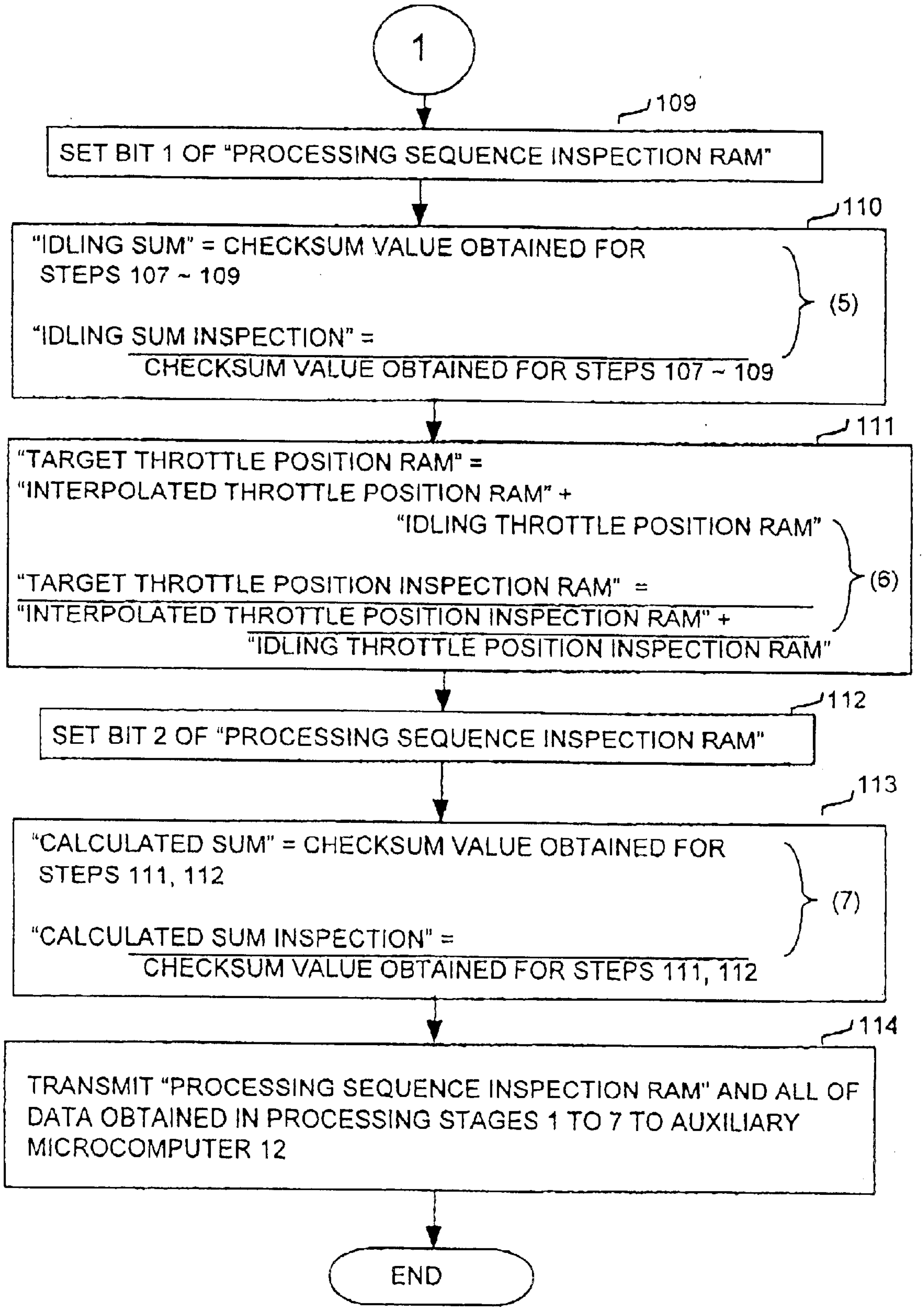

FIGS. 2A, 2B constitute a flow diagram of the processing routine that is executed by the main microcomputer 11 to calculate the target value of throttle position. This processing routine is executed periodically, with a fixed period, for example once in every 2 ms. In this processing, in addition to calculating the target value of throttle position, resource inspection data (described hereinafter) relating to resources of the main microcomputer 11 that are involved in that throttle opening calculation are also calculated. In the following, values which are calculated in the course of deriving the target throttle position value and are temporarily stored in the RAM of the main microcomputer 11 before being used in a subsequent calculate or transmitted to the auxiliary microcomputer 12 will be referred to as RAM values.

In the processing routine shown in FIGS. 2A, 2B, the main microcomputer 11 first (step 101) clears all bits of a binary value which is then stored (i.e., in the RAM of the main microcomputer 11) with the identifier "PROCESSING SEQUENCE INSPECTION RAM". A plurality of bits of this binary value are predetermined as corresponding to respective timings along the processing sequence shown, and each time a specific part of the processing sequence is completed, the corresponding bit in the "PROCESSING SEQUENCE INSPECTION RAM" value is set to indicate this (to the "1" state, in this embodiment). By performing successive updating in that way, the final value of "PROCESSING SEQUENCE INSPECTION RAM", on completion of the processing sequence to obtain a target throttle position value, indicates whether all of specific stages of that sequence have been executed.

Processing to calculate a target value of throttle position is then performed. This processing can be broadly divided into the following:

(a) Steps 102~106 This is processing relating to calculation of an interpolated value of throttle position, based on the accelerator position.

(b) Steps 107~110 This is processing relating to calculation of an idling throttle position value (i.e., an amended value of throttle position, which is to be set when the engine is idling), based on idling speed control information.

(c) Steps 111~113 This is processing relating to summing the interpolated target value of throttle position and the idling value of throttle position, to obtain the target throttle position value.

The above will be described in more detail in the following. In steps 102 to 106, firstly in step 102, the accelerator position (i.e., obtained as a digital value by A–D conversion of the signal from the accelerator position sensor 21) is temporarily stored in the RAM of the main microcomputer 11 with the identification "INTERPOLATION PARAMETER RAM", while the inverse of that value (i.e., the one's complement value) is similarly stored, with the identification "INTERPOLATION PARAMETER INSPECTION RAM". These contents of step 102 will be referred to as processing stage 1.

Next in step 103, an interpolated value of target throttle position is calculated, using the value stored as "INTERPOLATION PARAMETER RAM", e.g., in conjunction with a memory map which is stored in the ROM of the main microcomputer 11. In step 104, the value obtained in step 103 is stored with the identification INTERPOLATED THROTTLE POSITION RAM, while the inverse of that value is stored with the identification "INTERPOLATED THROTTLE POSITION INSPECTION RAM". These contents of step 104 will be referred to as processing stage 2. Next in step 105, bit (the LSB) of the aforementioned PROCESSING SEQUENCE INSPECTION RAM value is set (i.e., to the "1" state).

In step 106, a checksum is calculated for ROM codes which were read out from the ROM of the main microcomputer 11 and used in the processing of steps 101 to 106 to obtain the interpolated throttle position value, and that checksum value is then stored with the identification "INTERPOLATION SUM", while the inverse of the checksum value is stored with the identification "INTERPOLATION SUM INSPECTION". The contents of step 106 will be referred to as processing stage 3.

Next, in step 107, the amended throttle position is calculated, based on the aforementioned idling speed control information. In step 108, the value obtained in step 107 is stored with the identification "IDLING THROTTLE POSITION RAM", while the inverse of that value is stored with the identification "IDLING THROTTLE POSITION INSPECTION RAM". These contents of step 108 will be referred to as processing stage 4. Next in step 109, bit 1 of PROCESSING SEQUENCE INSPECTION RAM is set.

The checksum value that is calculated for ROM codes relating to the calculations of steps 107 to 109 is then stored with the identification "IDLING SUM", while the inverse of that value is stored with the identification "IDLING SUM INSPECTION", in step 110. These contents of step 110 will be referred to as processing stage 5.

In step 111, the previously calculated values INTERPOLATED THROTTLE. POSITION RAM and IDLING THROTTLE POSITION RAM are summed, and the result is stored with the identification TARGET THROTTLE POSITION RAM, while the inverse of that sum value is stored with the identification TARGET THROTTLE POSITION INSPECTION RAM. These contents of step 111 will be referred to as processing stage 6. In step 112, bit 2 of PROCESSING SEQUENCE INSPECTION RAM is set.

In step 113, the sum of the checksum values obtained for ROM codes relating to the processing of steps 111, 112 is calculated, and is stored with the identification CALCULATED SUM, while the inverse of that calculated sum value is stored with the identification CALCULATED SUM INSPECTION. These contents of step 113 will be referred to as processing stage 7.

The final value of PROCESSING SEQUENCE INSPECTION RAM and each of the pairs of values which are calculated in the processing stages 1 to 7 above will be respectively referred to as resource inspection data sets, which are used by the auxiliary microcomputer 12 as described hereinafter to judge whether all of the resources of the main microcomputer 11 (i.e., ROM, RAM, etc.) that have been used in the processing to derive the value TARGET THROTTLE POSITION RAM have functioned normally. In the final step (step 114) all of the resource inspection data sets, i.e., the respective pairs of resource inspection values that were calculated in the processing stages 1 to 7 and the final contents of PROCESSING SEQUENCE INSPECTION RAM, are transmitted by the main microcomputer 11 to the auxiliary microcomputer 12, together within the same data communication packet.

Since the resource inspection data sets include the target value of throttle position, derived in step 111, it can be understood that each time a new target value of throttle position is calculated by the main microcomputer 11, that value is then transmitted to the auxiliary microcomputer 12 at the same time as the resource inspection data relating to calculation of that target value.

Figure 3A:
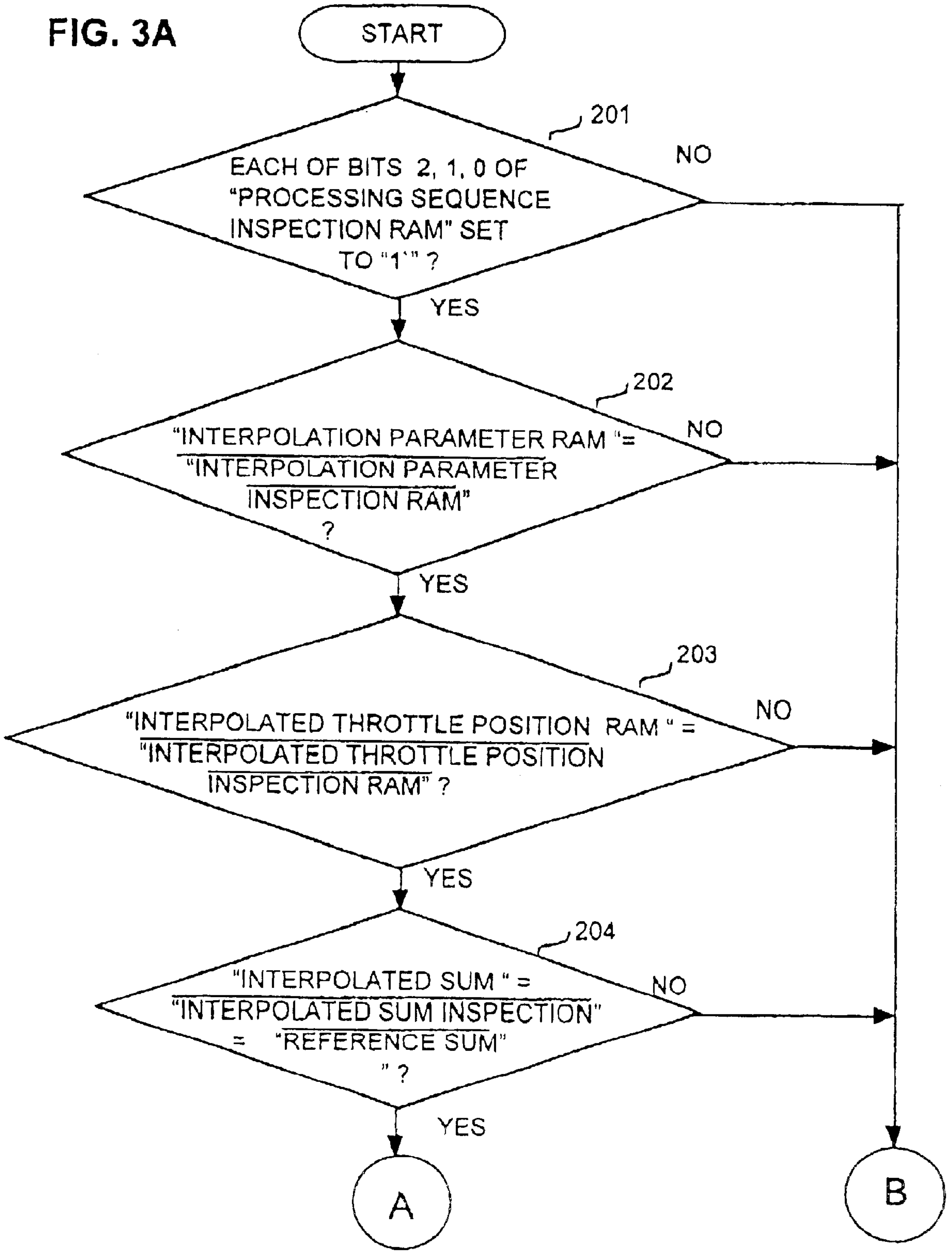
FIGS. 3A, 3B constitute a flow diagram of processing executed by an auxiliary microcomputer for monitoring the operation of a main microcomputer of the embodiment.
Figure 3B:
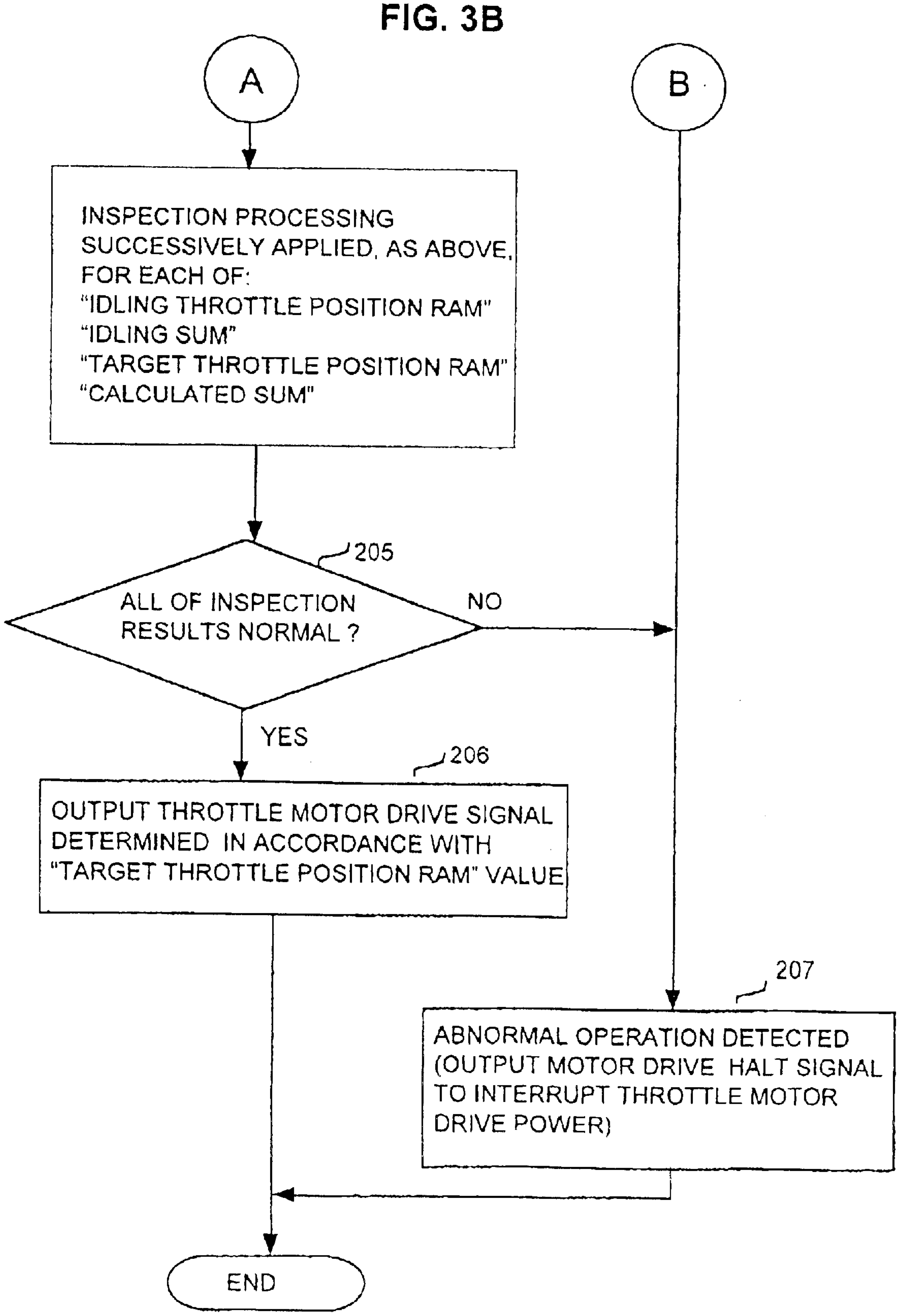

FIGS. 3A, 3B constitute a flow diagram of monitoring processing that is executed by the auxiliary microcomputer 12 to monitor the operation of the main microcomputer 11. Each time the processing routine of FIGS. 2A, 2B is executed and a resultant data packet is received, the auxiliary microcomputer 12 judges whether the main microcomputer 11 is operating normally, based on the received PROCESSING SEQUENCE INSPECTION RAM and the other resource inspection data. Based on that judgement, the auxiliary microcomputer 12 determines whether or not the target throttle position value calculated by the main microcomputer 11 will actually be applied to control the throttle.

In the processing of FIGS. 3A, 3B, in step 201, a decision is made as to whether all of the bits 0, 1 and 2 of PROCESSING SEQUENCE INSPECTION RAM have been set to "1". If a NO decision is reached (indicating that at least one of these bits is in the "0" state) then this indicates that not all of the results from the processing stages 1 to 6 were obtained in the same execution of the processing routine of FIGS. 2A, 2B (i.e., the most recent execution of that routine). This is taken as an indication of abnormal operation of the main microcomputer 11, and so step 107 is then executed. If a YES decision is made in step 201, then steps 202 to 205 are executed to judge the remaining resource inspection data.

In step 202, the INTERPOLATION PARAMETER RAM value and the inverse of the INTERPOLATION PARAMETER INSPECTION RAM value are compared, to judge whether these are identical. If they are identical, i.e., no error has occurred, then step 203 is executed, in which the INTERPOLATED THROTTLE POSITION RAM value and the inverse of the INTERPOLATED THROTTLE POSITION INSPECTION RAM value are similarly compared. If these are found to be identical, then step 204 is executed, in which the INTERPOLATION SUM value and the inverse of the INTERPOLATION SUM INSPECTION value are compared. If they are found to be an identical value, then that value is compared with a value identified as REFERENCE INTERPOLATION SUM which has been stored beforehand in memory of the auxiliary microcomputer 12. The reason for this operation is as follows. If the INTERPOLATION SUM and inverse of INTERPOLATION SUM INSPECTION are found to be identical, then this indicates that the CPU of the main microcomputer 11 is operating normally with respect to reading out data from ROM that are required for deriving the INTERPOLATED THROTTLE value, and performing calculations (e.g., 1's complement calculation), and that data are being correctly transmitted by the main microcomputer 11 and received by the auxiliary microcomputer 12. However if there is an error in a ROM code itself, e.g., due to a defective ROM, then it will be impossible for the auxiliary microcomputer 12 to detect this based upon the INTERPOLATION SUM and INTERPOLATION SUM INSPECTION values received from the main microcomputer 11. With this embodiment therefore, in the inspection step 204, the REFERENCE INTERPOLATION SUM value which is held stored in the auxiliary microcomputer 12 and which should be identical to the received INTERPOLATION SUM value if the latter is correct, is compared with the received INTERPOLATION SUM value (if that has been found to be identical to INTERPOLATION SUM INSPECTION). In that way, checking of the ROM of the main microcomputer 11 is also performed.

If a YES decision is reached in step 204 then thereafter, similar inspection processing steps to those of steps 202 to 204 are applied for the IDLING INTERPOLATION RAM, IDLING SUM, TARGET THROTTLE POSITION RAM and CALCULATED SUM values. These processing steps not shown in detail in FIGS. 3A, 3B, to simplify the diagram.

If it is found that all of these are normal, i.e., a YES decision in step 205, the step 206 is executed in which processing is executed to generate a throttle drive signal value, which is supplied to the motor drive circuit 23. The PID (Proportional, Integral, Differential) method can be used in this processing to derive the throttle motor drive signal value. This can be summarized as follows. A proportionality term, a differential term, and an integration term are calculated based on the value of the (A–D converted) throttle a position) and on the value TARGET THROTTLE POSITION RAM, and a value of throttle motor drive current is calculated based on these terms. As mentioned hereinabove, the effective motor drive current level is controlled by current switching, and the calculated throttle drive signal value is used to determine the duty factor of this current switching.

If it is found in any of the steps 201 to 205 that an abnormality has been detected, i.e., a NO decision has been reached in at least one step, then step 207 is executed, in which a "motor drive halt signal" (i.e., a "1" level output) is supplied from the auxiliary microcomputer 12 to the OR gate 13. The resultant output from the OR gate 13, acting on the motor drive circuit 23, causes the throttle drive motor 24 to be disconnected from its power source, to effect fail-safe operation. In this condition, the throttle functions in a minimal operating mode, referred to as the "limp home" mode" or "limp" mode, in which the vehicle driver has only a limited degree of throttle control (i.e., via some form of mechanical linkage to the throttle).

Figure 4:
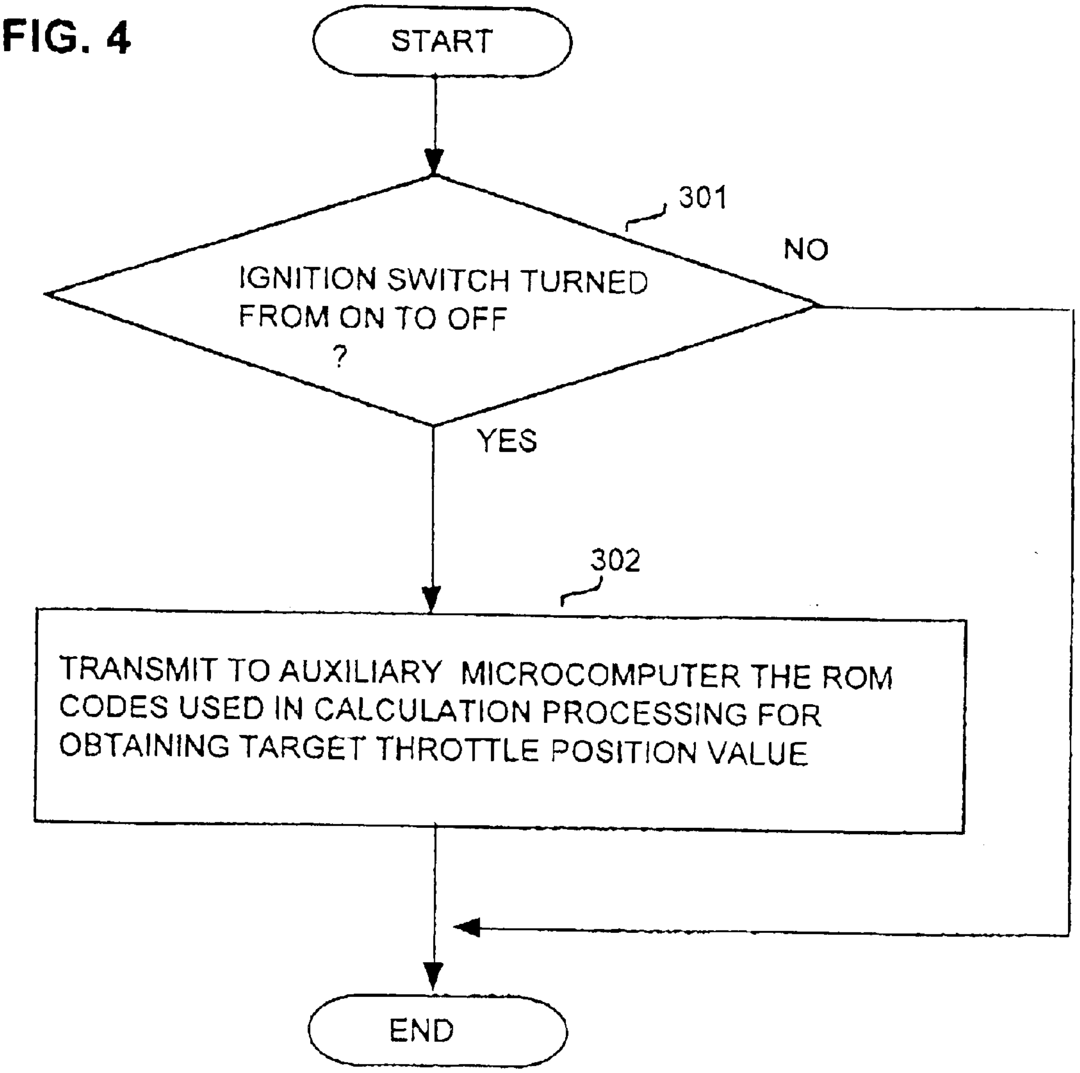
FIG. 4 is a flow diagram for describing processing executed by the main microcomputer to transfer ROM codes to the auxiliary microcomputer.
Figure 5:
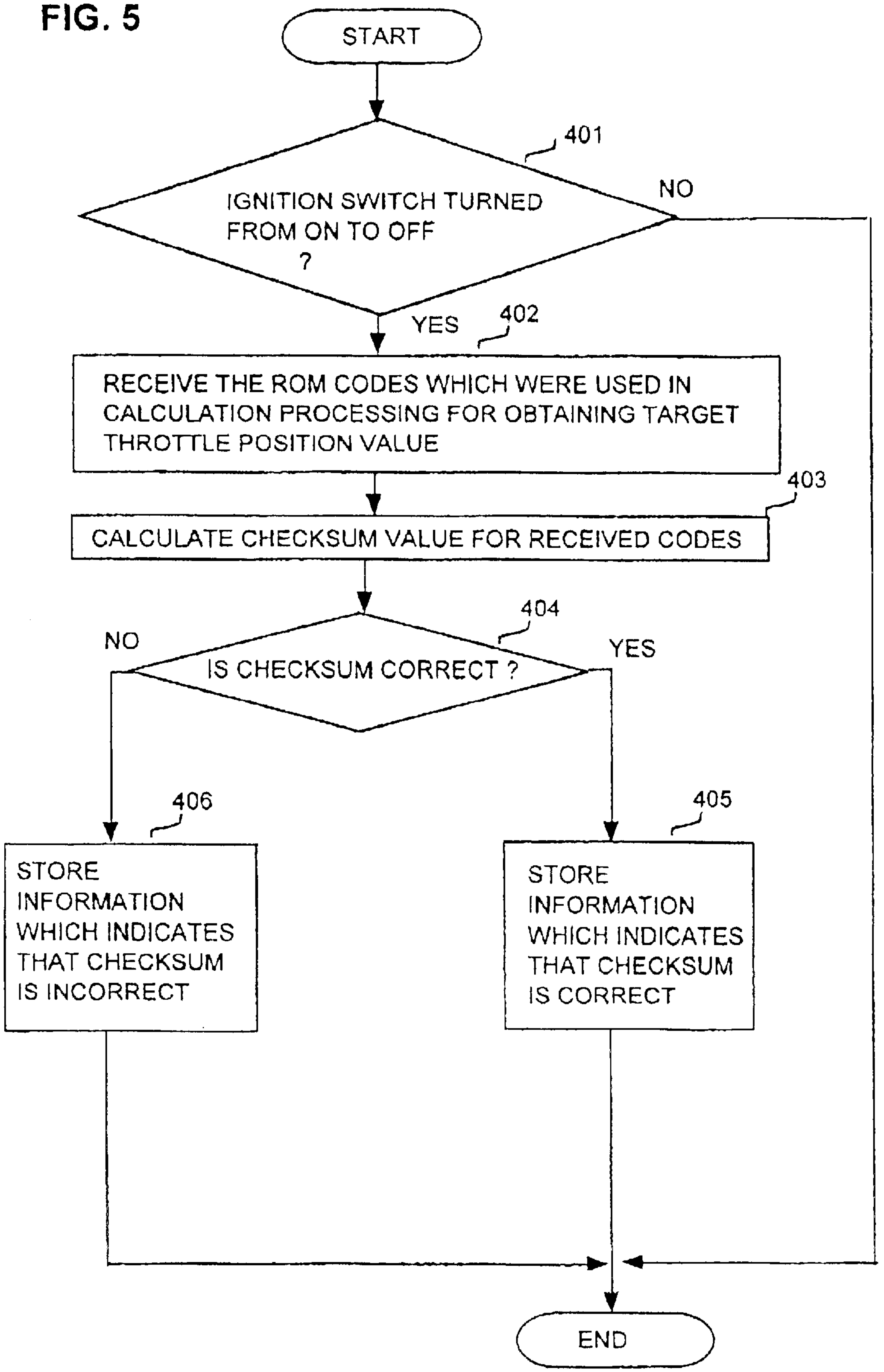
FIG. 5 is a flow diagram for describing processing executed by the auxiliary microcomputer for ROM codes transmitted from the main microcomputer.

With this embodiment, ROM checksum addition inspection is performed by the auxiliary microcomputer 12 each time the ignition switch of the vehicle is switched off, as a further function for monitoring the main microcomputer 11. FIG. 4 is a flow diagram of a processing routine executed by the main microcomputer 11, while FIG. 5 shows the corresponding processing routine which is executed by the auxiliary microcomputer 12. These routines are executed to detect when the vehicle ignition switch is set from the on to off state, at which time a delay interval occurs before the main relay of the vehicle disconnects the vehicle battery from the electrical system (that interval being referred to in the following as the main relay delay interval), and, when switch-off of the ignition switch is detected, to transmit ROM codes from the main microcomputer 11 to the auxiliary microcomputer 12 and implement inspection of these ROM codes by the auxiliary microcomputer 12, during the main relay delay interval.

In step 301 of FIG. 4, a decision is made as to whether the ignition switch has been changed from the on to the off state. If it is found that this has occurred (a YES decision) then step 302 is executed in which the main microcomputer 11 transmits to the auxiliary microcomputer 12 the ROM codes relating to the overall sequence of processing that was executed to obtain the target throttle position value which has been most recently transmitted to the auxiliary microcomputer 12. This consists of the processing that was executed to successively calculate the values INTERPOLATED THROTTLE POSITION RAM, IDLING THROTTLE POSITION RAM, and finally THROTTLE TARGET THROTTLE POSITION RAM, as described above referring to FIGS. 2A, 2B.

In the processing of FIG. 5, If it is found in step 401 that the ignition switch has been turned to the OFF position, then step 402 is executed, in which the ROM code transmitted from the main microcomputer 11 as described above is received by the auxiliary microcomputer 12. In step 403, a checksum for the received ROM codes is calculated, and in step 404 a decision is made as to whether or not the checksum is normal. If the checksum value is found to be normal, the step 405 is executed in which checksum confirmation information is stored (i.e., in a non-volatile memory device) which indicates that the checksum processing has reached a normal result. If the checksum value is found to be abnormal, then step 406 is executed in which checksum confirmation information is stored which indicates that the checksum processing has reached an abnormal result. Each time the ignition switch is turned on, the auxiliary microcomputer 12 reads out the stored checksum confirmation information. In that way, the auxiliary microcomputer 12 can perform appropriate processing (e.g., implementing cut-off of the throttle motor power, as described above) if the checksum confirmation information indicates an abnormal result.

The effects obtained with the above embodiment are as follows. Even if the throttle control system becomes expanded in scale, due to the need to harmonize various different types of control and to increase the number of control parameters, so that the main microcomputer 11 must perform more complex processing to calculate a target value of throttle position, this will not result in a corresponding increase in the amount of resources which are required for the auxiliary microcomputer 12, or the amount of monitoring processing which must be performed by the auxiliary microcomputer 12. That is to say, the processing for monitoring the main microcomputer 11 can be considered to be substantially independent of changes in the control system. Hence, such microcomputer monitoring can be achieved at lower cost, while at the same time ensuring that appropriate monitoring can be executed.

Furthermore even if the vehicle control specifications are changed, it is unnecessary to substantially modify the monitoring software of the auxiliary microcomputer 12. Hence, the time required for overall software development can be shortened.

Specifically, each time that a new target value of throttle position is calculated, the following inspection operations are performed for each of the determining factors that are involved in calculating that target value. Firstly, each of the values which are derived in the process of calculating the target throttle position value and are temporarily stored in RAM are inspected (RAM inspection). Secondly, the ROM codes used in the calculation processing to obtain that target value are inspected (ROM inspection). Thirdly, the sequence of calculations whereby that target value is derived is inspected using the PROCESSING SEQUENCE INSPECTION RAM bits as described above (processing sequence inspection, i.e., indicative of whether or not the CPU of the main microcomputer 11 is functioning normally). In that way, by using all of these forms of inspection, the overall operation of the main microcomputer 11 can be effectively monitored, i.e., each of the resources of that microcomputer such as the CPU, ROM and RAM can be monitored.

It has been found that such a method of microcomputer monitoring provides substantially the same level of accuracy that can be obtained by a prior art monitoring method in which two microcomputers perform the same calculation of each target value of throttle position, and the calculated values are compared to verify that they match.

Since each new target value of throttle position and the corresponding resource inspection values, are transmitted from the main microcomputer 11 to the auxiliary microcomputer 12 at the same time, the auxiliary microcomputer 12 can perform monitoring of the main microcomputer 11 by real time operation. Hence an increased degree of monitoring reliability can be achieved.

Furthermore, each time the vehicle ignition switch is turned off, the ROM codes used in calculation the target throttle position value are transmitted to the auxiliary microcomputer 12 and a corresponding checksum is calculated. In that way, the auxiliary microcomputer 12 monitors the processing whereby the main microcomputer 11 performs ROM code checksum calculation. Hence, the reliability of monitoring the main microcomputer 11 is further enhanced. Moreover, since the ROM codes used in this monitoring are transmitted from the main microcomputer 11 to the auxiliary microcomputer 12 while the communication link between these microcomputers is functioning in a low-load condition (i.e., the main relay delay interval) there is a minimal possibility of errors being introduced in the ROM codes as a result of the transmit/receive operation.

Second Embodiment

A second embodiment will be described in the following, with only the points of difference from the first embodiment being described in detail.

Figure 7:
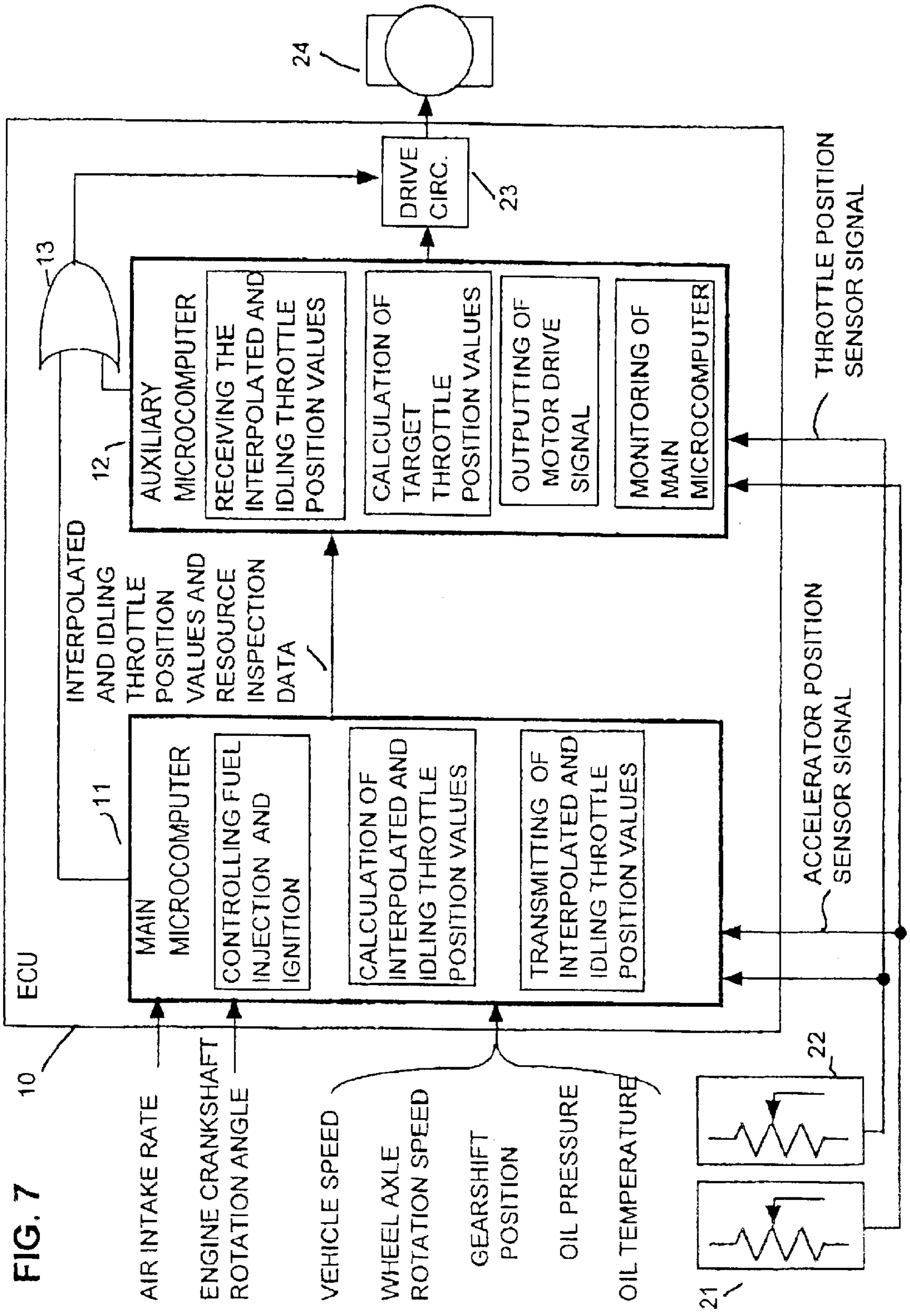
FIG. 7 is a general system block diagram of the second embodiment.

With the main microcomputer monitoring processing of FIGS. 3A, 3B above, if abnormal operation is detected for any one of the various resource inspection values, then the supply of drive power to the throttle motor is immediately interrupted. However in order to ensure appropriate operation when the vehicle is driven after the fail-safe function has been invoked, it is preferable to assign each of the various determining factors involved in calculating the target value of throttle position as being either valid or non-valid with respect to being used in applying throttle control, in accordance with the conditions of the corresponding resource inspection values. FIG. 7 is a general system block diagram of the second embodiment. With this embodiment, the value INTERPOLATED THROTTLE POSITION RAM (which depends upon the accelerator position as described hereinabove) is categorized as a basic control quantity (i.e., which is essential for calculating a target throttle position value), while the value IDLING THROTTLE POSITION RAM is categorized as an auxiliary control quantity (i.e., which can if necessary be omitted from the calculation of the target throttle position value), and the throttle control operation is halted only if abnormality is detected with respect to a basic control quantity, in this case the INTERPOLATED THROTTLE POSITION RAM value. If some abnormality is found in relation to calculation of an auxiliary control quantity, in this case the value IDLING THROTTLE POSITION RAM, then throttle control continues to be applied, but with the IDLING THROTTLE POSITION RAM values being excluded from the calculations of target throttle position values.

The above will be described referring to FIGS. 6A, 6B which constitute a flow diagram of a monitoring processing routine which is periodically executed by the auxiliary microcomputer 12 to monitor the main microcomputer 11, i.e., which is executed each time a new THROTTLE POSITION TARGET RAM value, and the associated resource inspection data, are received by the auxiliary microcomputer 12. This processing replaces that of FIGS. 3A, 3B of the first embodiment.

In step 501, a decision is made as to whether all of the bits 0, 1 or 2 of the received PROCESSING SEQUENCE INSPECTION RAM have been set to "1". If a NO decision is made, the step 502 is executed, in which the supply of drive power to the throttle motor 24 is interrupted, since the main microcomputer 11 has not correctly completed all of the stages 1 to 6 of the processing sequence shown in FIGS. 2A, 2B, i.e. abnormal operation has been detected.

If a YES decision is reached in step 501 then step 503 is executed, in which a decision is made as whether the processing relating to calculation of the INTERPOLATED THROTTLE POSITION RAM value is found to be normal. Specifically, the INTERPOLATION PARAMETER RAM, INTERPOLATED THROTTLE POSITION RAM, and INTERPOLATION SUM values are inspected and judged. This processing corresponds to the contents of the sequence of steps 202 to 204 in FIGS. 3A, 3B described hereinabove.

If a YES decision is reached in step 503 then step 504 is executed, in which a decision is made as whether the processing relating to calculation of the idling throttle position is found to be normal. Specifically, the IDLING THROTTLE POSITION RAM, and IDLING SUM values are judged.

If a YES decision is made in both of the steps 503 and 504 then step 505 is executed, in which the value TARGET THROTTLE POSITION RAM is calculated by summing the INTERPOLATED THROTTLE POSITION RAM and IDLING THROTTLE POSITION RAM values. A corresponding throttle motor drive signal value, derived based on the TARGET THROTTLE POSITION RAM value, is then outputted from the auxiliary microcomputer 12, as described above for the first embodiment (step 507).

If it is found that no abnormality is found from inspection of processing relating to deriving the INTERPOLATED THROTTLE POSITION RAM value, but that abnormality is found relating to the IDLING THROTTLE POSITION RAM value, then step 506 is executed, in which the TARGET THROTTLE POSITION RAM value is obtained directly as the INTERPOLATED THROTTLE POSITION RAM value, without using the IDLING THROTTLE POSITION RAM value. Corresponding data expressing a throttle motor drive signal value are then outputted from the auxiliary microcomputer 12, based on the TARGET THROTTLE POSITION RAM value, as described above for the first embodiment (step 507)

If the inspection relating to calculation of the INTERPOLATED THROTTLE POSITION RAM value show an abnormality (i.e., a NO decision is reached in step 503) then step 502 is executed, in which the supply of power to the throttle motor 24 is interrupted, since it has been found that the main microcomputer 11 is functioning abnormally.

Figure 6A:
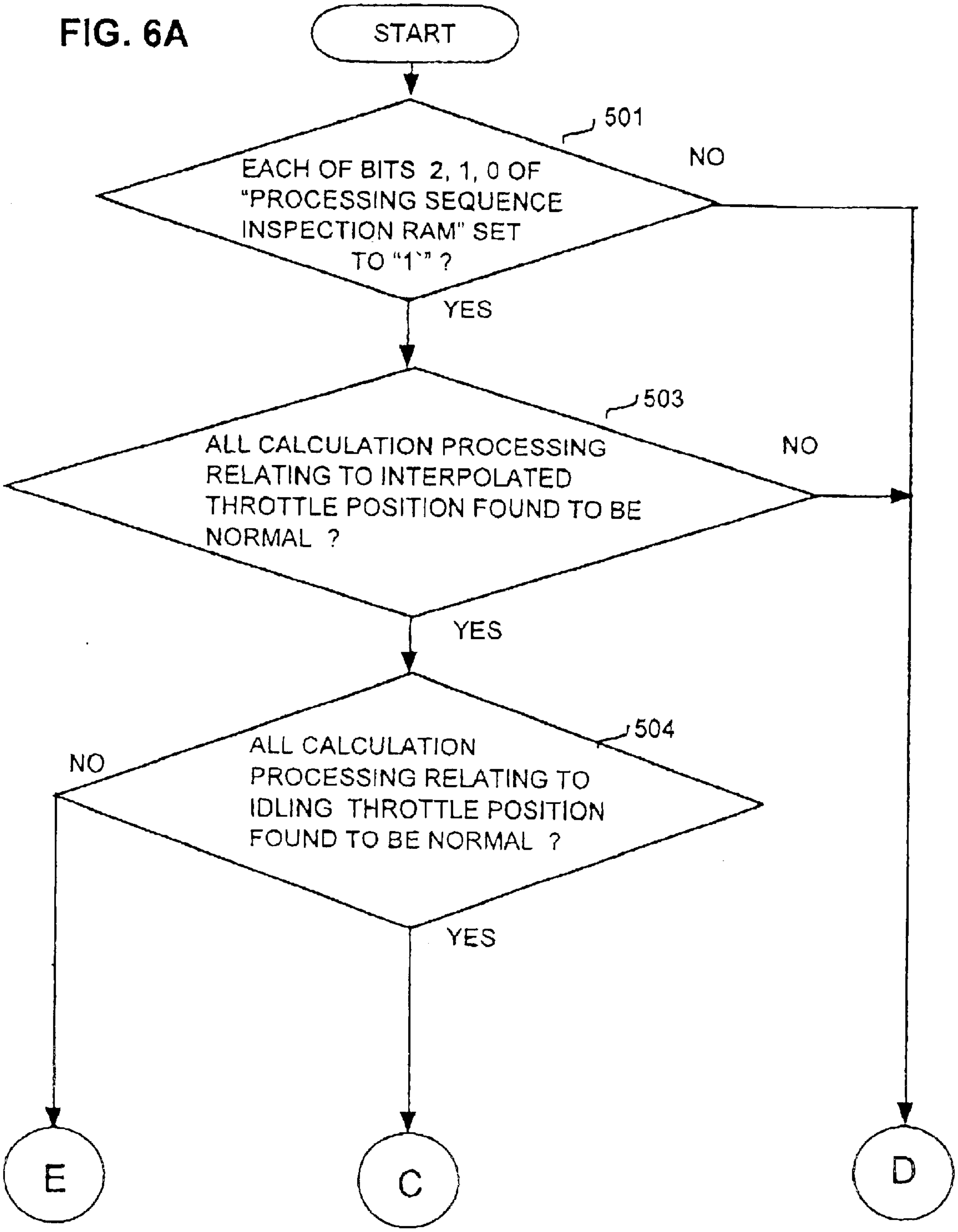
FIGS. 6A, 6B constitute a flow diagram of processing executed by the main microcomputer for monitoring the operation of the main microcomputer, with a second embodiment.
Figure 6B:
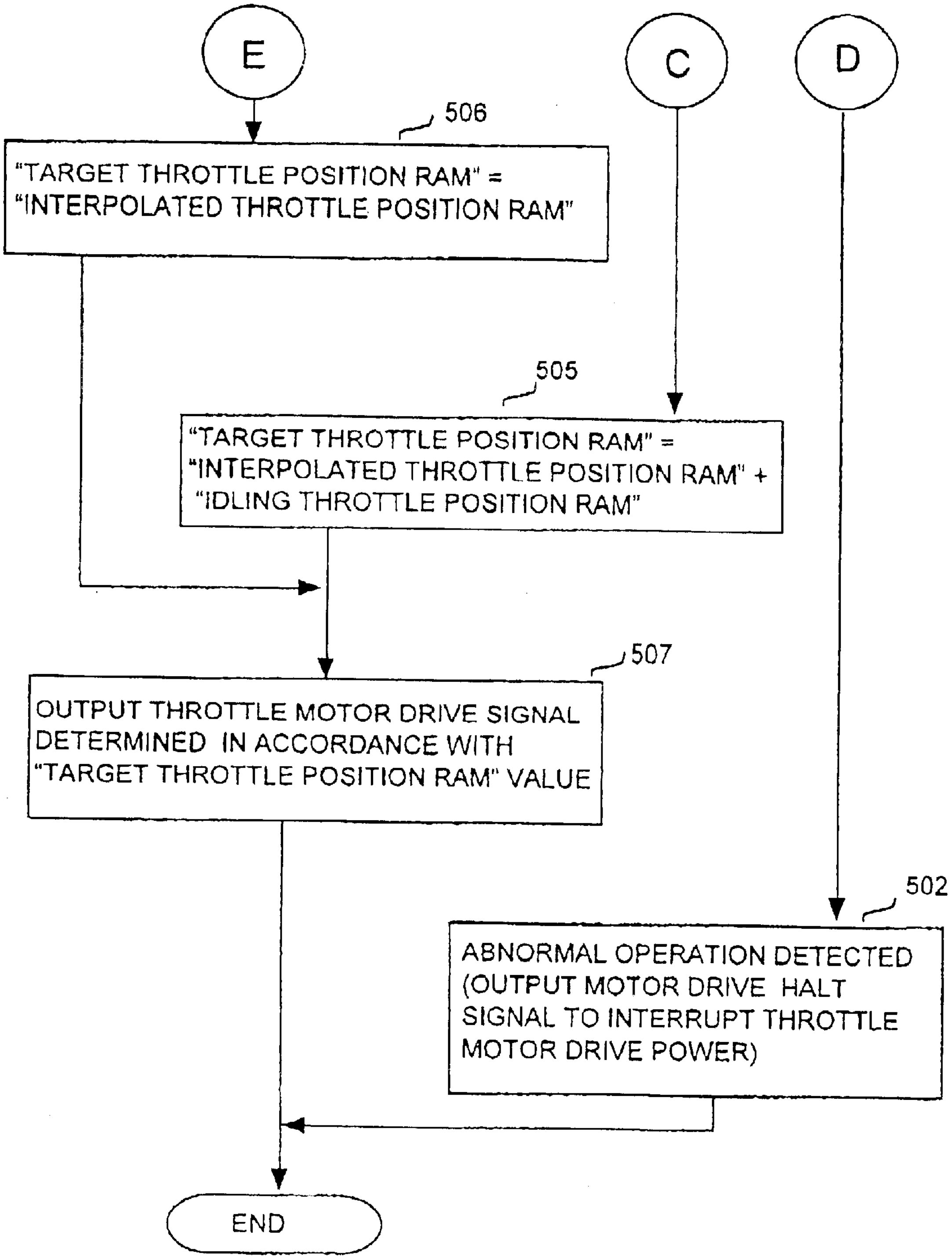

With the processing of FIGS. 6A, 6B, if abnormality is detected for a predetermined specific part of the determining factors whereby the main microcomputer 11 calculates the target value of throttle position, then that part of the determining factors is excluded from use in determining that target value. More specifically, if abnormality is detected with respect to a determining factor that is of basic importance (i.e., a basic control quantity, as described hereinabove) then throttle control operation is halted and the supply of throttle drive motor power is interrupted, while if abnormality is detected for one or more determining factors which are of secondary importance (i.e., auxiliary control quantities, as described hereinabove), then the auxiliary microcomputer 12 may judge that throttle control operation is to continue, while excluding the determining factor for which abnormality has been detected.

Hence with this embodiment, when an abnormality of operation of the main microcomputer 11 is detected by the auxiliary microcomputer 12, instead of unconditionally interrupting the supply of drive power to the throttle drive motor 24 as is done with the first embodiment, fail-safe processing is executed that is appropriate for the type of abnormality which has been detected. Hence, improved flexibility of control can be achieved.

It should be noted that the PROCESSING SEQUENCE DETECTION RAM value is a binary number and so can be examined as a bit pattern. Hence, if its value is found to be less than the correct value (indicating that one or more stages of the calculation processing sequence have been omitted by the main microcomputer 11), it would further be possible for the auxiliary microcomputer 12 to judge which stage has been omitted (i.e., since the corresponding bit has not been set) and utilize that information as resource inspection data which is specific to a particular one of the determining factors.

Third Embodiment

Figure 8:
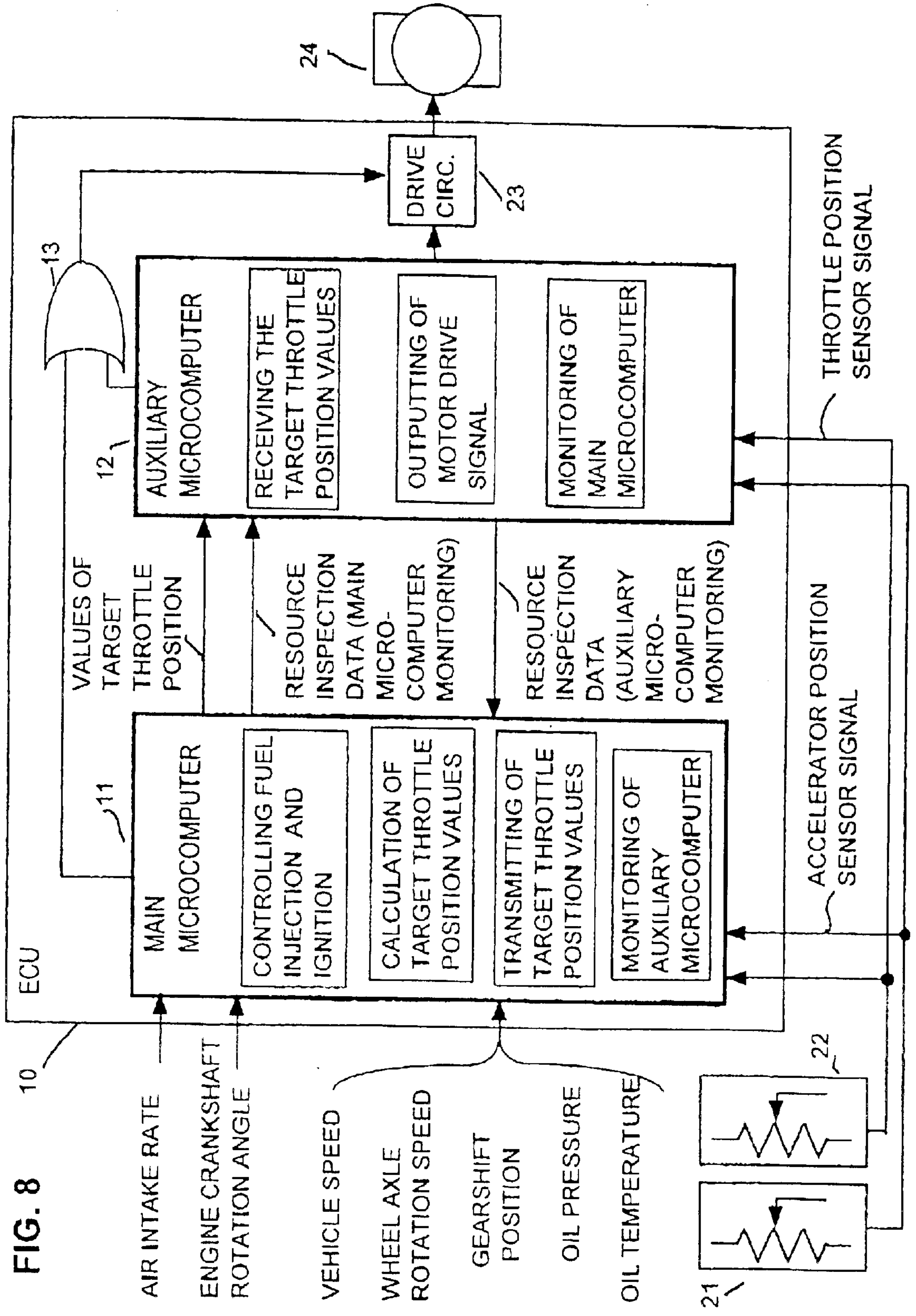
FIG. 8 is a general system block diagram of a third embodiment, in which the main microcomputer also monitors the operation of the auxiliary microcomputer.

With the first or second embodiments, it is possible that the inspection processing (shown in FIGS. 3A, 3B) performed by the auxiliary microcomputer 12 to monitor the main microcomputer 11 may itself be defective, in which case the monitoring results will be unreliable. FIG. 8 is a general block diagram of a third embodiment in which the electronic control apparatus is configured such that, in addition to the operations described hereinabove for the first embodiment, the main microcomputer 11 also monitors the functioning of the auxiliary microcomputer 12. Specifically, the auxiliary microcomputer 12 of this embodiments periodically performs the monitoring processing sequence shown in FIGS. 3A, 3B for the first embodiment, each time a new target value of throttle position is calculated and transmitted from the main microcomputer 11 together with the related resource inspection data. However in addition, during execution of the monitoring processing sequence, resource inspection data relating to that monitoring processing are derived by the auxiliary microcomputer 12 and transmitted to the main microcomputer 11 upon completion of the monitoring processing sequence (i.e., assuming that no abnormality of operation of the main microcomputer 11 has been detected). Specifically, ROM code checksum values are calculated for each of the steps shown in FIGS. 3A, 3B, or for a specific range of these steps, as resource inspection data. In addition, the third embodiment is preferably configured such that a value is stored and periodically updated at one or more timings during execution of the monitoring processing sequence, with specific bits of that value being utilized for processing sequence inspection, in the same manner as the aforementioned PROCESSING SEQUENCE INSPECTION RAM of the main microcomputer 11. That is, the value is cleared prior to the start of the monitoring processing sequence shown in FIGS. 3A, 3B, and respectively predetermined bits of that processing sequence inspection value are successively set upon completion of the corresponding steps of the monitoring processing sequence, in the same way as described above for FIGS. 2A, 2B and updating of the PROCESSING SEQUENCE INSPECTION RAM contents. On each completion of the monitoring processing sequence (if no abnormality of operation of the main microcomputer 11 has been detected) the value is transmitted to the main microcomputer 11, as resource inspection data.

If no abnormality in the operation of the main microcomputer 11 is detected by the inspection processing sequence executed by the auxiliary microcomputer 12 (i.e., corresponding to a YES decision being made in step 205 of FIGS. 3A, 3B) then that processing sequence inspection value which has been derived by the auxiliary microcomputer 12 is transmitted to the main microcomputer 11 as part of the resource inspection data generated by the auxiliary microcomputer 12.

With the third embodiment, the main microcomputer 11 is configured to perform an inspection processing sequence, basically corresponding to that of FIGS. 3A, 3B, using the resource inspection data received from the auxiliary microcomputer 12 to monitor the operation of the auxiliary microcomputer 12.

Since the configuration and operation of the third embodiment will be apparent from the description of the first embodiment, detailed description will be omitted. Although the invention has been described in the above with reference to specific embodiments, various modifications or alternatives to these embodiments could be envisaged, as follows. It would for example be possible to implement more detailed, or less detailed inspection of resources, e.g., by increasing or decreasing the number of processing stages for which processing sequence inspection is applied (i.e., using PROCESSING SEQUENCE INSPECTION RAM). That is to say, instead of calculating the INTERPOLATED THROTTLE POSITION RAM, IDLING THROTTLE POSITION RAM and TARGET THROTTLE POSITION RAM values as the three stages (steps 102~104, steps 106~108, steps 110 and 111) shown in FIGS. 2A, 2B, i.e., with the respective stages being inspected, it would for example be possible to perform a more detailed inspection of the contents of each of these stages. For example, operations such as deriving a checksum, setting a specific bit of PROCESSING SEQUENCE INSPECTION RAM, etc., could be performed for each of the various successive operations involved in establishing the INTERPOLATED THROTTLE POSITION RAM value.

Alternatively, it would be possible to simplify the inspection processing, by combining two or more of the above plurality of stages into a single stage, i.e., which is assigned only a single bit in PROCESSING SEQUENCE INSPECTION RAM.

Furthermore it would be possible to modify the form of inspection in accordance with whether or not the microcomputers are operating under a heavy processing load, or in accordance with some other condition of the microcomputers, or based on a past history of occurrence of abnormal operation, etc. For example, it would be possible to omit the execution of part of the checksum calculations by a microcomputer when the microcomputer is operating under a heavy processing load.

Moreover it is not essential that the contents of PROCESSING SEQUENCE INSPECTION RAM be updated at the respective points in the processing flow that are indicated in FIGS. 2A, 2B, during calculation of the target value of throttle opening. It would be possible to perform these updatings at other timings during the processing, or to perform a greater number of such updatings (i.e., inspect a greater number of points along the processing sequence). The greater the number of such updatings that are performed during a calculation, the greater will be the monitoring accuracy.

What is claimed is:

1. An electronic control apparatus of a motor vehicle, including a first microcomputer and a second microcomputer, said first microcomputer periodically calculating a value of a target control quantity for use in controlling an actuator of an engine of said vehicle, based on parameter values expressing a current operating condition of the engine, wherein said second microcomputer is adapted to monitor operations of said first microcomputer including processing to calculate said target control quantity, each time that said first microcomputer calculates a target control quantity value, said first microcomputer calculates resource inspection data relating to each of respective resources of said first microcomputer which are involved in said calculation, and transmits said resource inspection data to said second microcomputer, and said second microcomputer is adapted to receive said resource inspection data and monitor the functioning of said first microcomputer, based on said resource inspection data.

2. An electronic control apparatus of a motor vehicle, including a first microcomputer and a second microcomputer, said first microcomputer periodically calculating a value of a target control quantity for use in controlling an actuator of an engine of said vehicle, based on parameter values expressing a current operating condition of the engine, wherein said second microcomputer is adapted to monitor operations of said first microcomputer including processing to calculate said target control quantity, each time that said first microcomputer calculates a target control quantity value, said first microcomputer calculates resource inspection data relating to each of respective resources of said first microcomputer which are involved in said calculation, and transmits said resource inspection data to said second microcomputer, said second microcomputer is adapted to receive said resource inspection data and monitor the functioning of said first microcomputer, based on said resource inspection data, said first microcomputer includes a RAM (Random Access Memory), with values which are successively derived by said first microcomputer during a processing sequence to calculate said target control quantity being temporarily stored in said RAM, and said first microcomputer is adapted to read out each of said calculated values from said RAM and transmits said each calculated value to said second microcomputer together with an inverse value of said each calculated value, as resource inspection data.

3. An electronic control apparatus of a motor vehicle, including a first microcomputer and a second microcomputer, said first microcomputer periodically calculating a value of a target control quantity for use in controlling an actuator of an engine of said vehicle, based on parameter values expressing a current operating condition of the engine, wherein said second microcomputer is adapted to monitor operations of said first microcomputer including processing to calculate said target control quantity, each time that said first microcomputer calculates a target control quantity value, said first microcomputer calculates resource inspection data relating to each of respective resources of said first microcomputer which are involved in said calculation, and transmits said resource inspection data to said second microcomputer, said second microcomputer is adapted to receive said resource inspection data and monitor the functioning of said first microcomputer, based on said resource inspection data, said first microcomputer includes memory means having calculation processing codes stored therein, with a plurality of said calculation processing codes being read out and utilized by said first microcomputer during a processing sequence to calculate said target control quantity, and said first microcomputer is adapted to calculate a checksum value of said calculation processing codes used in said processing sequence and transmits said checksum value to said second microcomputer, as resource inspection data.

4. An electronic control apparatus as claimed in claim 3, said electronic control apparatus being supplied with power from a power source having a shutdown delay function whereby a shutdown delay interval occurs following actuation of a switch for interruption of said supply of power, with power continuing to be supplied to said electronic control apparatus until completion of said shutdown delay interval, wherein said first microcomputer is adapted to transmit said calculation processing codes used in said processing sequence to said second microcomputer, during each occurrence of said shutdown delay, and said second microcomputer is adapted to calculate a checksum value for said calculation processing codes received from said first microcomputer, and judge said checksum value to detect abnormal operation of said first microcomputer.

5. An electronic control apparatus of a motor vehicle, including a first microcomputer and a second microcomputer, said first microcomputer periodically calculating a value of a target control quantity for use in controlling an actuator of an engine of said vehicle, based on parameter values expressing a current operating condition of the engine, wherein said second microcomputer is adapted to monitor operations of said first microcomputer including processing to calculate said target control quantity, each time that said first microcomputer calculates a target control quantity value, said first microcomputer calculates resource inspection data relating to each of respective resources of said first microcomputer which are involved in said calculation, and transmits said resource inspection data to said second microcomputer, said second microcomputer is adapted to receive said resource inspection data and monitor the functioning of said first microcomputer, based on said resource inspection data, and said first microcomputer is adapted to initialize a value for use as a processing sequence inspection value, prior to execution of a processing sequence to calculate a target control quantity value, successively update said processing sequence inspection value at each of one or more predetermined timings during said processing sequence, and transmit said processing sequence inspection value to said second microcomputer, as resource inspection data, upon completion of said processing sequence.

6. An electronic control apparatus as claimed in claim 1, wherein said first microcomputer calculates said target control quantity by combining a plurality of determining factors, and wherein said first microcomputer is adapted to calculate resource inspection data sets respectively corresponding to said determining factors, and transmit said resource inspection data sets to said second microcomputer, and said second microcomputer is adapted to judge said resource inspection data sets respectively separately.

7. An electronic control apparatus of a motor vehicle, including a first microcomputer and a second microcomputer, said first microcomputer periodically calculating a value of a target control quantity for use in controlling an actuator of an engine of said vehicle, based on parameter values expressing a current operating condition of the engine, wherein said second microcomputer is adapted to monitor operations of said first microcomputer including processing to calculate said target control quantity, each time that said first microcomputer calculates a target control quantity value, said first microcomputer calculates resource inspection data relating to each of respective resources of said first microcomputer which are involved in said calculation, and transmits said resource inspection data to said second microcomputer, said second microcomputer is adapted to receive said resource inspection data and monitor the functioning of said first microcomputer, based on said resource inspection data, said first microcomputer calculates said target control quantity by combining a plurality of determining factors, said first microcomputer is adapted to calculate resource inspection data sets respectively corresponding to said determining factors, and transmit said resource inspection data sets to said second microcomputer, and said second microcomputer is adapted to judge said resource inspection data sets respectively separately, and said first microcomputer is adapted to initialize a value for use as a processing sequence inspection value, prior to execution of a processing sequence to calculate a target control quantity value, successively update said processing sequence inspection value on completion of each of respective calculation processing stages for deriving said determining factors, and transmit said processing sequence inspection value to said second microcomputer, as resource inspection data, upon completion of said processing sequence.

8. An electronic control apparatus of a motor vehicle, including a first microcomputer and a second microcomputer, said first microcomputer periodically calculating a value of a target control quantity for use in controlling an actuator of an engine of said vehicle, based on parameter values expressing a current operating condition of the engine, wherein said second microcomputer is adapted to monitor operations of said first microcomputer including processing to calculate said target control quantity, each time that said first microcomputer calculates a target control quantity value, said first microcomputer calculates resource inspection data relating to each of respective resources of said first microcomputer which are involved in said calculation, and transmits said resource inspection data to said second microcomputer, said second microcomputer is adapted to receive said resource inspection data and monitor the functioning of said first microcomputer, based on said resource inspection data, and the apparatus further includes data communication means whereby said first microcomputer transmits data to said second microcomputer in data packets, wherein said first microcomputer is adapted to transmit each calculated value of said target control quantity together with resource inspection data relating to calculation of said value, within one of said data packets.

9. An electronic control apparatus as claimed in claim 1, wherein said second microcomputer is adapted to calculate second resource inspection data relating to said monitoring processing, during execution of monitoring processing by said second microcomputer to monitor the operation of said first microcomputer based on said resource inspection data, and to transmit said second resource inspection data to said first microcomputer, and said first microcomputer is adapted to execute processing for monitoring the operation of said second microcomputer, based upon said second resource inspection data received from said second microcomputer.

10. An electronic control apparatus of a motor vehicle, including a first microcomputer and a second microcomputer, said first microcomputer periodically calculating a value of a target control quantity for use in controlling an actuator of an engine of said vehicle, based on parameter values expressing a current operating condition of the engine, wherein said second microcomputer is adapted to monitor operations of said first microcomputer including processing to calculate said target control quantity, each time that said first microcomputer calculates a target control quantity value, said first microcomputer calculates resource inspection data relating to each of respective resources of said first microcomputer which are involved in said calculation, and transmits said resource inspection data to said second microcomputer, said second microcomputer is adapted to receive said resource inspection data and monitor the functioning of said first microcomputer, based on said resource inspection data, said first microcomputer calculates said target control quantity by combining a plurality of determining factors, said first microcomputer is adapted to calculate resource inspection data sets respectively corresponding to said plurality of determining factors, during execution of a processing sequence to calculate said target control quantity, and to transmit said resource inspection data sets to said second microcomputer, and said second microcomputer is adapted to judge said resource inspection data sets respectively separately, to determine for each of said determining factors whether or not said determining factor is valid for use in calculating a value of said target control quantity.

11. An electronic control apparatus as claimed in claim 10, wherein said determining factors are respectively categorized as being basic control quantity terms or secondary control quantity terms, said second microcomputer is adapted to produce a command signal for terminating control operation of said actuator by said electronic control apparatus, when it is judged that abnormality has occurred in calculating a determining factor that is a basic control quantity term, based on a resource inspection data set corresponding to said determining factor, and said second microcomputer is adapted to execute processing whereby a value of said target control quantity is calculated with said secondary control quantity term being omitted from the calculation, when it is judged that abnormality has occurred in calculating a determining factor which is a secondary control quantity term, based on a resource inspection data set corresponding to said determining factor.

12. An electronic control apparatus of a motor vehicle, including a first microcomputer and a second microcomputer, the apparatus configured for monitoring of at least one of said microcomputers by the other one thereof, wherein said first microcomputer is adapted to calculate resource inspection data relating to each of respective resources of said first microcomputer, based on internal processing executed by said first microcomputer, and to transmit said resource inspection data to said second microcomputer, said resource inspection data at least including a data bit which is set to a predetermined value each time a specific part of a processing sequence has been completed, and said second microcomputer is adapted to receive said resource inspection data and monitor the functioning of said first microcomputer, based on said resource inspection data.

13. An electronic control apparatus of a motor vehicle, including a first microcomputer and a second microcomputer, said first microcomputer periodically calculating a value of a target control quantity for use in controlling an actuator of an engine of said vehicle, based on parameter values expressing a current operating condition of the engine, wherein said second microcomputer is adapted to monitor operations of said first microcomputer including processing to calculate said target control quantity, each time that said first microcomputer calculates a target control quantity value, said first microcomputer calculates resource inspection data relating to each of respective resources of said first microcomputer which are involved in said calculation, and transmits said resource inspection data to said second microcomputer, said resource inspection data at least including a data bit which is set to a predetermined value each time a specific part of a processing sequence has been completed, and said second microcomputer is adapted to receive said resource inspection data and monitor the functioning of said first microcomputer, based on said resource inspection data.

14. A method of operating an electronic control apparatus of a motor vehicle, the electronic control apparatus including a first microcomputer and a second microcomputer, the method comprising:

periodically calculating at the first microcomputer a value of a target control quantity for use in controlling an actuator of an engine of said vehicle, based on parameter values expressing a current operating condition of the engine;

monitoring, at the second microcomputer, operations of said first microcomputer including processing to calculate said target control quantity;

each time that said first microcomputer calculates a target control quantity value, calculating, at the first microcomputer, resource inspection data relating to each of respective resources of said first microcomputer which are involved in said calculation;

transmitting said resource inspection data to said second computer;

receiving, at the second computer, said resource inspection data; and monitoring, at the second microcomputer, the functioning of said first microcomputer, based on said resource inspection data.

15. An electronic control apparatus of a motor vehicle, including a microcomputer and a monitoring apparatus, said monitoring apparatus periodically calculating a value of a target control quantity for use in controlling an actuator of an engine of said vehicle, based on parameter value expressing a current operating condition of the engine, wherein said monitoring apparatus is adapted to monitor operations of said microcomputer including processing to calculate said target control quantity, each time that said microcomputer calculate a target control quantity value, said microcomputer calculates resource inspection data relating to each of respective resources of said microcomputer which are involved in said calculation, and transmits said resource inspection data to said monitoring apparatus, and said monitoring apparatus is adapted to receive said resource inspection data and monitor the functioning of said microcomputer, based on said resource inspection data.

16. An electronic control apparatus as claimed in claim 15, wherein said monitoring apparatus is a microcomputer.

* * * * *